United States Patent
Bool et al.

(10) Patent No.: US 12,345,414 B2
(45) Date of Patent: Jul. 1, 2025

(54) METHOD FOR ENHANCING COMBUSTION REACTIONS IN HIGH HEAT TRANSFER ENVIRONMENTS

(71) Applicants: Lawrence Bool, East Aurora, NY (US); Kelly Fangmei Tian, Williamsville, NY (US); Bradley D Damstedt, Williamsville, NY (US); Arthur W Francis, Clarence Center, NY (US)

(72) Inventors: Lawrence Bool, East Aurora, NY (US); Kelly Fangmei Tian, Williamsville, NY (US); Bradley D Damstedt, Williamsville, NY (US); Arthur W Francis, Clarence Center, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 16/032,468

(22) Filed: Jul. 11, 2018

(65) Prior Publication Data
US 2019/0017696 A1   Jan. 17, 2019

Related U.S. Application Data

(60) Provisional application No. 62/531,549, filed on Jul. 12, 2017.

(51) Int. Cl.
*F23L 7/00* (2006.01)
*F22B 1/26* (2006.01)

(52) U.S. Cl.
CPC .................. *F23L 7/00* (2013.01); *F22B 1/26* (2013.01); *F23L 7/005* (2013.01); *F23L 7/007* (2013.01); *F23D 2900/14681* (2013.01); *F23L 2900/07001* (2013.01); *F23L 2900/07002* (2013.01); *F23L 2900/07003* (2013.01); *F23L 2900/07005* (2013.01); *F23L 2900/07009* (2013.01); *Y02E 20/32* (2013.01)

(58) Field of Classification Search
CPC .... F22B 1/26; F23D 2900/14681; F23L 7/00; F23L 7/005; F23L 7/007; F23L 2900/07001; F23L 2900/07002; F23L 2900/07003; F23L 2900/07005; F23L 2900/07009; Y02E 20/32
USPC ....................................................... 122/31.1
See application file for complete search history.

(56) References Cited

U.S. PATENT DOCUMENTS

| | | | |
|---|---|---|---|
| 4,074,708 A * | 2/1978 | Hochmuth | F23N 1/08 122/479.7 |
| 4,930,454 A | 6/1990 | Latty et al. | |
| 5,722,821 A * | 3/1998 | Christenson | F23L 7/005 431/115 |

(Continued)

FOREIGN PATENT DOCUMENTS

RU   2427048 C2   8/2011

*Primary Examiner* — Steven B McAllister
*Assistant Examiner* — Benjamin W Johnson
(74) *Attorney, Agent, or Firm* — Iurie A. Schwartz

(57) ABSTRACT

The present invention relates to a method of combusting a fuel gas with a stoichiometric or near stoichiometric amount of molecular oxygen in the presence of a controlled amount of a diluent to enhance the extent of combustion reactions in high heat transfer environment. The energy released is utilized to heat a fluid by direct contact with the flame. The diluent can be different from the fluid to be heated with respect to composition, temperature or pressure. The diluent can be same as or derived from the fluid to be heated.

6 Claims, 4 Drawing Sheets

(56) References Cited

U.S. PATENT DOCUMENTS

| | | |
|---|---|---|
| 7,770,646 B2 | 8/2010 | Klassen et al. |
| 2007/0202452 A1 | 8/2007 | Rao |
| 2009/0071648 A1* | 3/2009 | Hagen .................... E21B 43/24 |
| | | 166/272.1 |
| 2012/0160187 A1* | 6/2012 | Bunio ................... F22B 1/1853 |
| | | 122/31.1 |
| 2015/0377146 A1 | 12/2015 | Della-Fera et al. |

* cited by examiner

METHOD FOR ENHANCING COMBUSTION REACTIONS IN HIGH HEAT TRANSFER ENVIRONMENTS

CROSS REFERENCE TO RELATED APPLICATION

This application claims the benefit of provisional application Ser. No. 62/531,549, filed Jul. 12, 2017, entitled METHOD FOR ENHANCING COMBUSTION REACTIONS IN HIGH HEAT TRANSFER ENVIRONMENTS.

FIELD OF THE INVENTION

The present invention relates to combustion in high heat transfer environments. More particularly, the present invention relates to improving combustion efficiency in direct contact heat transfer systems by establishing a controlled mass and heat exchange relationship between a flame and a fluid stream to be heated. The present invention also relates to improvements in the production of a heated fluid stream such as steam or carbon dioxide, especially those useful in enhancing the production of oil from subterranean formations.

BACKGROUND OF THE INVENTION

Description of Related Art

Direct contact heating systems typically utilize heat released from combustion of a fuel with air or oxygen enriched air or oxygen or an oxygen containing stream. In these systems the products of combustion, and the resulting energy from combustion contained within them, are mixed directly with the fluid or media to be heated. This direct mixing leads to enhanced heat transfer from the hot combustion products to the fluid to be heated. However, rapid mixing coupled with rapid heat transfer can lead to incomplete combustion. This could be due to poor mixing of the oxidizer and the combustibles. Simply improving the mixing may not be sufficient to improve the extent of reaction. The incomplete combustion can also be due to inhibition of the combustion reactions if the reactants (fuel, oxidant) are diluted too much before the reaction can be completed. A common method to address both poor mixing and rapid dilution is to shield the combustion reaction zone from the fluid to be heated to allow combustion reactions to reach equilibrium, or near equilibrium before mixing with the fluid or media to be heated. However, in some cases this method is not enough to ensure complete reaction of the oxygen or fuel. Even when the burners are operated such that the oxygen provided is greater than that required to complete combustion of the fuel (i.e., super-stoichiometric, or fuel lean) the resulting mixture of combustion gases and fluid to be heated can contain significant quantities of intermediate combustible products, such as CO and $H_2$. This result is due, in part, to the equilibrium composition of the combustion products. Rapid mixing of these combustion products with the fluid to be heated can result in quenching the reactions, leading to high concentrations of these species in the combined, heated, fluid. These products of incomplete combustion can be hazardous or problematic to downstream operations. Similarly, even when the burner is operated under sub-stoichiometric, that is fuel rich conditions, meaning less oxygen is supplied than required to completely combust the fuel, significant levels of oxygen can be seen in the resulting combustion gas. With this type of fuel rich operation the oxygen levels can be high enough to constitute a safety concern. For some applications even low (ppmv) levels of oxygen in the combustion product stream can be undesirable due to potential corrosion concerns.

Previous efforts to use combustion for direct contact heat exchange have employed a coolant for cooling the combustor wall and/or the burner face. The coolant is introduced in a controlled manner to accomplish cooling duty without mixing into the flame. The flow rate of coolant is typically limited to that required to cool the combustor wall and/or the burner face. Many of these arrangements require very detailed cooling passage designs. Commercial burners designed without provision for combustor cooling optimize combustion by shielding the flame from the fluid to be heated. This can be done by locating the burner(s) behind a bluff body.

U.S. Pat. No. 4,074,708 entitled "Burning Hydrogen and Oxygen to Superheat Steam" relates to a method and device for superheating steam through direct contact with an oxy-hydrogen flame. The steam is superheated to a target temperature to allow rapid restarts of steam turbines for power generation. In the device 'a series of louver-like openings' are oriented to allow steam to flow on the inside surface of the combustor in order 'to cool it and keep it from overheating by the hot combustion taking place within the sleeve'. Further steam is allowed into the combustor upstream of the burner to allow for initial cooling of the combustion products, presumably again to avoid overheating of the components of the combustor. A series of swirl generating vanes at the exit of the combustor are included to enhance mixing between the products of combustion and the steam. No mention is made of combustion efficiency, residual oxygen, or designing the steam flow to optimize these parameters.

Russian Patent No. RU 2427048 entitled "Hydrogen Combustion System for Steam-Hydrogen live Steam Superheating in Cycle of Nuclear Power Plant" relates to a method and device to superheat steam generated from a nuclear power plant prior to feeding it to a steam turbine. The objective is to increase the power generation capacity of the plant. The device consists of a hydrogen-oxygen burner that can be operated by fuel staging to maintain a low temperature. Specifically less hydrogen is supplied into the burner than required to consume the oxygen. The flame temperature of the resulting oxygen rich flue gas is low enough to minimize cooling requirements of the combustor. Additional hydrogen is added to the hot gas at the exit of the burner to complete combustion in an environment where the outside of the combustor is cooled by steam flow. No attempt appears to be made to moderate the oxy-hydrogen flame by diluent (steam) addition.

U.S. Pat. No. 7,770,646 B2 entitled "System, Method and Apparatus for Hydrogen-Oxygen Burner in Downhole Steam Generator" relates to a downhole burner used for increasing steam quality, or superheating steam, as it is routed into a well for hydrocarbon recovery. This burner sits within a cooling liner. This liner is designed to separate the combustion from the main steam flow and control mixing of the steam into the combustion products. The burner consists of a plate with multiple rings of holes for oxidant and fuel. At the burner end of the cooling liner, steam is allowed to enter the liner through a series of 'effusion holes' that are angled to prevent steam from penetrating too far into burner and allows the steam to move along the walls of liner to keep it cool. This intent to prevent mixing of the steam into the flame zone is also illustrated in Table 1 of that patent where the degree of radial penetration ("injection") of the effusion jets is very low in the burner region. Further down the cooling liner, where one skilled in the art would expect the combustion reactions to be essentially complete, 'mixing' holes are included to create jets of steam that penetrate into the combustion products to achieve mixing and superheating. Use of $CO_2$ is also mentioned for burner cooling. However, no mention is made of controlling steam mixing to optimize combustion.

The present inventors have determined that the disadvantages of the related art can be overcome by an improved combustion method that increases the net heat released from combustion reactions in direct contact heating systems. A fuel is reacted with an oxidant containing molecular oxygen. The oxidation reactions release heat. This causes the reaction mixture, a hot gas mixture, a flame to reach very high temperatures. The flame temperature will depend on the composition of the fuel, the composition of the oxidant, and the ratio of oxidant to fuel. For example a stoichiometric methane-oxygen flame at atmospheric conditions can reach high temperature, for example in excess of 5000° F. At such high temperatures, the composition of the resulting hot gas mixture is likely to approach equilibrium. Further, under equilibrium conditions the combustion products $CO_2$ and $H_2O$ can dissociate forming intermediate combustion products CO and $H_2$, as well as free radicals. If a fluid to be heated is allowed to rapidly mix with such a hot gas mixture, the temperature of the reaction mixture can drop to a level that limits the conversion of dissociated species into complete combustion products. By inhibiting the recombination, or reaction, of the dissociated species the net heat release is reduced and the amount of intermediates such as CO and $H_2$ is increased. The inventors have discovered that by introducing a controlled amount of diluent into the flame the extent of conversion of dissociated species into complete combustion products can be increased. The diluent is not a fuel. And while the diluent could contain oxygen (i.e., very fuel lean conditions) the resulting oxygen concentration in the mixed, heated, product may be too high for many applications. The mixing of diluent with reacting fuel and oxidant streams in the combustion zone results in a first heated gas mixture at a relatively lower flame temperature than would be found if the diluent had not been introduced. The relatively lower flame temperature would be sufficiently high to favor combustion reactions to proceed, allowing the reaction mixture to reach an equilibrium composition wherein more of the reaction products are not dissociated and are, therefore predominantly $CO_2$ and $H_2O$. The fluid or media to be heated is then allowed to interact with the first heated mixture. In this manner, the net heat released from combustion reactions in direct contact heating systems is increased. The diluent can be same or different from the fluid to be heated. Advantages of the present invention include: reduction in residual oxygen content, reduction in combustibles such as unreacted fuel and/or intermediate reaction products such as CO and $H_2$ in the heated fluid stream, and/or more complete conversion of both oxygen and fuel into combustion products and therefore heat released. The higher the amount of residual oxygen or the amounts of products of incomplete combustion in heated fluid stream, the more severe are cost and efficiency penalties.

The resulting heated fluid stream such as high temperature steam can be utilized for injection into a well to heat the oil in the subterranean formation. The high temperature steam can be free of oxygen and/or free of intermediate combustibles such as CO and $H_2$. The injected high temperature steam transfers heat to the oil, reducing viscosity of the oil and making recovery of the oil possible from the same well or more often from another well. In some situations the injection of steam makes it possible to recover oil that could not otherwise be recovered at all, and in other situations the injection of steam makes it possible to recover more oil than would otherwise be possible.

Typically injection steam is generated above ground in a suitable apparatus, such as a "once through steam generator" (OTSG) which produces steam at less than 100% quality, typically 80% quality. Water is separated and saturated steam is sent through insulated piping to a wellhead for injection into a well. In some cases the wellhead may be many miles away. As the steam travels through the piping, the steam loses some heat in spite of the insulation, which leads to some of the steam condensing and, therefore, reduces the thermal energy available for delivery to the formation. The present invention can be employed to boost steam quality and deliver higher amounts of thermal energy to the formation. By offering a method to reduce or eliminate excess $O_2$ in the injected steam it is also possible to reduce the corrosion potential of the heated steam supplied to enhance oil production from subterranean formation. In addition, the fluid to be heated can include carbon dioxides and other inert gases for various applications.

Other objects and aspects of the present invention will become apparent to one of ordinary skill in the art upon review of the specification, drawings and claims appended hereto.

BRIEF SUMMARY OF THE INVENTION

This invention pertains to improving combustion efficiency in direct contact heat transfer systems by establishing a controlled mass and heat exchange relationship between a flame and a fluid stream to be heated.

In one aspect of the present invention a combustion method is provided. The method includes:
providing a fuel, an oxidant, a diluent, and a fluid to be heated;
reacting the fuel with the oxidant in the presence of the diluent to form a first heated mixture;
forming a heated fluid by directly contacting the fluid to be heated with the first heated mixture;
wherein the heated fluid contains a lower concentration of carbon monoxide and/or molecular oxygen than obtainable by directly contacting the fluid with an otherwise identical flame that does not use diluent addition.

In one embodiment the diluent and the fluid to be heated have substantially same composition. In another embodiment the diluent and the fluid to be heated are different. In some embodiments the diluent can be provided separately from either fuel or oxidant or both, or premixed with fuel or oxidant or both.

In another aspect, the present invention is a method for direct contact heating of a fluid to provide high temperature fluid such as steam for injection into a well to heat the oil in the subterranean formation. The high temperature steam can be free of oxygen and/or free of intermediate combustibles such as CO and $H_2$.

As used herein, the "oxidant" means oxygen enriched air or oxygen or a fluid containing at least 21 vol % molecular oxygen. As used herein, "superheated steam" means steam which is at a temperature that is higher than its vaporization (boiling) point at the absolute pressure where the temperature measurement is taken. Superheated steam does not contain liquid water.

As used herein, "direct heat exchange" and "direct heat transfer" mean transfer of heat to a material, which is intended to be heated, by directly contacting it with another material from which heat is transferred.

As used herein, "indirect heat exchange" and "indirect heat transfer" mean transfer of heat to a material, which is intended to be heated, from another material from which heat is transferred, in which the material to be heated does not directly contact the material from which heat is transferred.

As used herein, "flame" refers to a combustion reaction mixture.

BRIEF DESCRIPTION OF THE FIGURES

The objects and advantages of the invention will be better understood from the following detailed description of the preferred embodiments thereof in connection with the accompanying figures wherein like numbers denote same features throughout and wherein.

DETAILED DESCRIPTION OF THE INVENTION

For illustrative purposes the problem that the present invention addresses will be described with reference to a direct contact heat exchange system that heats a fluid stream by combusting a fuel gas containing methane and an oxidant containing molecular oxygen. For many applications operators seek to avoid adding anything other than pure combustion products ($CO_2$ and $H_2O$) to the fluid stream. Therefore, the oxidant fed is likely to be pure oxygen, and stoichiometric amounts of fuel and oxygen are utilized to provide the required heat.

Combustion of fuel such as methane with a stoichiometric amount of oxygen can result in a flame having an adiabatic flame temperature in excess of 5500° F. This flame, a heated gas mixture at such high temperature under chemical equilibrium conditions contains considerable amounts of dissociated products CO and $H_2$. Thus, the heat available for direct contact heating from this heated gas mixture is only a fraction of the fuel calorific value. In accordance with the present invention, when such a heated gas mixture is formed by combustion reactions occurring in the presence of a diluent that is not a fuel then, the chemical equilibrium shifts towards more complete combustion products, in other words at least some of the dissociated CO and $H_2$ form $CO_2$ and $H_2O$, respectively.

Figure 1:
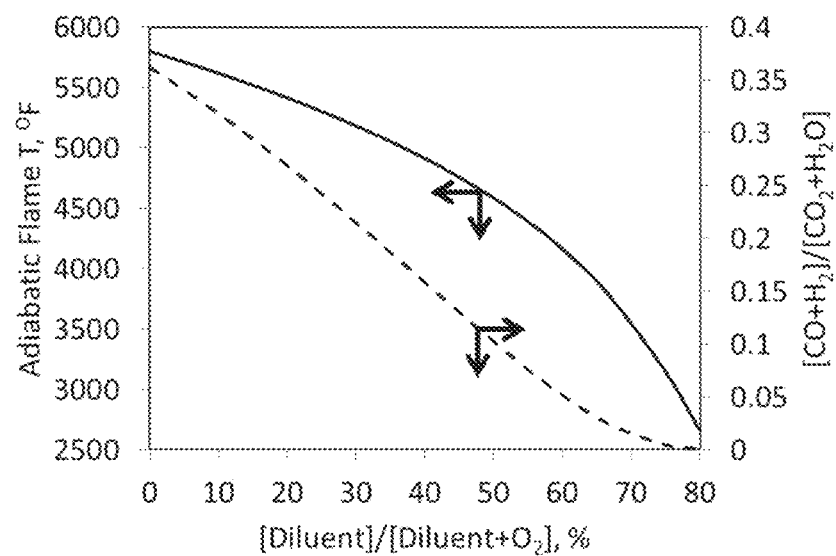
FIG. 1 is a plot of flame characteristics at equilibrium as a function of diluent concentration.
Figure 2:
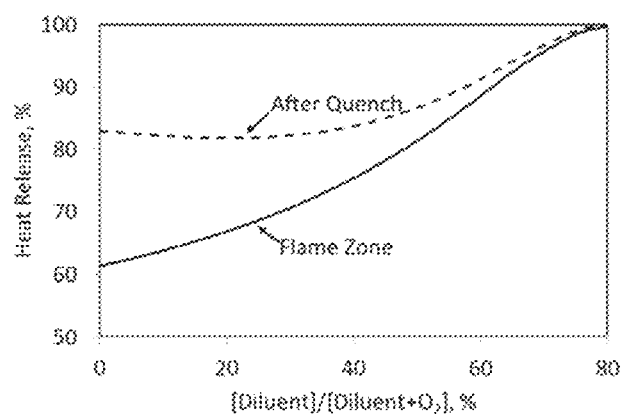
FIG. 2 is a plot of the total heat released as a function of diluent concentration.

This is illustrated in FIG. 1 that plots results of chemical equilibrium calculations. Adiabatic flame temperature is plotted on the left-side y-axis against mole % of diluent in a pseudo mixture of diluent and oxygen as x-axis. The molar ratio of dissociated products [$CO+H_2$] to complete combustion products [$CO_2+H_2O$] is plotted on the right-side y-axis against mole % of diluent in a pseudo mixture of diluent and oxygen as x-axis. The calculations assumed adiabatic combustion of methane (fuel) with stoichiometric amount of oxygen (oxidant) at 350 psia with combustion reactions occurring in the presence of various amounts of $CO_2$ added as a diluent to the combustion reaction mixture. Without limiting how the diluent is added to the combustion region, the effective diluent concentration (x-axis values) allows one skilled in the art to estimate the amount of diluent required to practice the current invention. The effective diluent concentration in this exemplary embodiment assumes pure $CO_2$ is fed to the combustion region such that the combustion reaction mixture gets diluted by the amount of $CO_2$ required to achieve the desired flame characteristics. In the absence of diluent or when the effective diluent concentration is low the chemical equilibrium calculation results suggest the flame, a heated gas mixture contains significant amounts of dissociated species CO and $H_2$. Under such conditions unreacted oxidant (residual oxygen) remains in the combustion mixture since it has not been consumed by the $H_2$ and CO. Contacting a large quantity of a fluid to be heated with the flame could quench the combustion process too soon, limiting conversion of dissociated species, thus resulting in higher amounts of CO, $H_2$, and/or $O_2$ in combined, heated fluid. This effect is illustrated in FIG. 2 using the same methane-oxygen flame as FIG. 1. Therefore, it is important that the residence time and temperature of reactive species in the flame be managed in a controlled manner to decrease the degree of dissociation and residual amounts of unreacted oxygen, fuel, and dissociated species in the heated gas mixture and increase the heat released. The present invention identifies a promising solution that delays mixing of fluid to be heated with a flame until the combustion reaction is complete; and reducing flame/reaction temperature to maximize conversion of dissociated species into complete combustion products.

Figure 3:
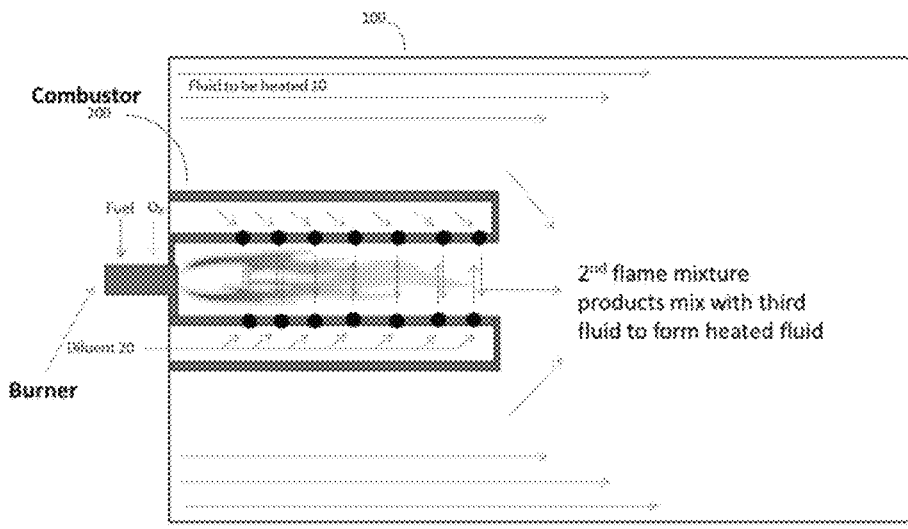
FIG. 3 is a schematic of a direct contact heating process configuration.

Turning to FIG. 3, and as illustrated in this exemplary embodiment, a process configuration is shown that heats a fluid 10 flowing through a conduit 100 or equivalent conveyance. Conduit 100 is made of any material capable of carrying the fluid stream at temperatures and pressures suitable for downstream operations. A combustion device 200 is positioned to be in fluid communication with fluid flowing through conduit 100. Oxidant and fuel are combusted in the combustion device in the presence of a diluent 20 to form a first heated gas mixture. The first heated gas mixture containing heat released from combustion reactions is utilized to heat the fluid stream 10.

It should be noted that FIG. 3 depicts introduction of diluent 20 into the combustion device, which may have an enclosure forming a combustion chamber within which the fuel and the oxidant combust before their combustion products contact the fluid stream 10 flowing through the conduit 100. As shown in FIG. 3, two pipes at different sizes can be mounted to the same flanges on which a burner is installed. The inner pipe, a shroud which is smaller, will enclose the burner flame and it will have ports drilled closer to the burner face. Diluent introduced into the annular space between the smaller and larger pipes, for example from the ports on the flanges that are in circular pattern surrounding the burner will be entrained into the inner tube thus mixing with the combustion reaction mixture. It also provides cooling to the inner tube wall. The amount of diluent added to the combustion mixture depends on several factors, including the size of the inner tube and the opening area of the ports on the inner tube. The length of the inner tube is another critical parameter in this design since it is important that the combustion is fully completed at the end of this inner tube before mixing with fluid to be heated takes place.

The amount of injection, and its location, could be controlled by the size and number of penetrations in the shroud. Although the shroud design may look similar to that suggested by U.S. Pat. No. 7,770,646, the purpose of the shroud is different. The penetrations near the flame would be designed to ensure mixing with the flame species in the actual flame, as opposed to avoiding the flame to just provide cooling for the shroud (as in U.S. Pat. No. 7,770,646). The driving force for diluent flow through the perforations could be either higher pressure of the diluent fluid, or by entrainment from the flame (similar to a venturi). Through knowledge of the mixing characteristics of the burner and careful design of the perforated shroud control of mixing the diluent fluid can be controlled to maximize heat release.

The shroud material should be chosen to avoid corrosion or other mechanical failures. Using an oxyfuel flame that could potentially attach to the shroud may limit the material choices significantly. One material that could be, for example, utilized is sintered silicon carbide, which is advertised to have very high thermal conductivity, high resistance to thermal shock stresses, and high corrosion resistance in oxidizing, reducing or other corrosive atmospheres.

In another exemplary embodiment the diluent 20 can be derived from fluid stream 10. The combustion device may consist of just inner pipe, shroud with ports drilled on this pipe at closer to the burner end thus allowing proper amount of diluent addition to combustion reaction mixture. In yet another exemplary embodiment of the present invention an entrainment limiting device can be employed. In this embodiment the shroud may or may not have ports drilled to facilitate diluent addition to the combustion reaction mixture. A recess placed around the burner limits the amount of fluid stream 10 added as a diluent to the combustion mixture reaction mixture. Through an understanding of the entrainment/mixing pattern of the burner it is possible to control the amount of diluent that is drawn in through the exit of the recess. For example, if the recess is very short, then the jet behaves very similar to a 'free jet' in a fluid stream with rapid mixing of the fluid into the flame products. In the other extreme if the recess is very long then no fluid is drawn into the flame. Basic burner characteristics, such as fuel and oxidant nozzle sizes, can also be used to control the degree of mixing.

This way controlled mixing of a sufficient quantity of a diluent with the combustion reaction mixture can be provided. The degree of mixing is defined based on the burner design and the recess design, and can be calculated using jet entrainment correlations, computational fluid dynamics (CFD) or other tools available to those skilled in the art. For instance, in the exemplary embodiments described above the controlled mixing of diluent with the combusting reaction mixture of fuel and oxidant results in reduced residual oxygen, fuel, and/or dissociated combustion products than if the diluent had not been added. In contrast, uncontrolled mixing of a large quantity of fluid to be heated with an otherwise identical flame without dilution can rapidly quench the flame, not allowing sufficient time for dissociated radicals to react and form $CO_2$ and $H_2O$. The controlled mixing avoids the quenched 'radicals' inability to recombine.

Figure 4:
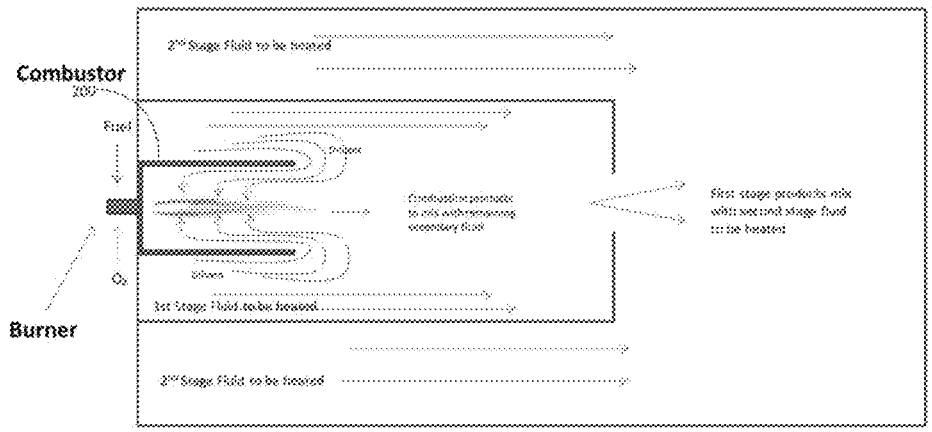
FIG. 4 is a schematic of an alternate process configuration.
Figure 5:
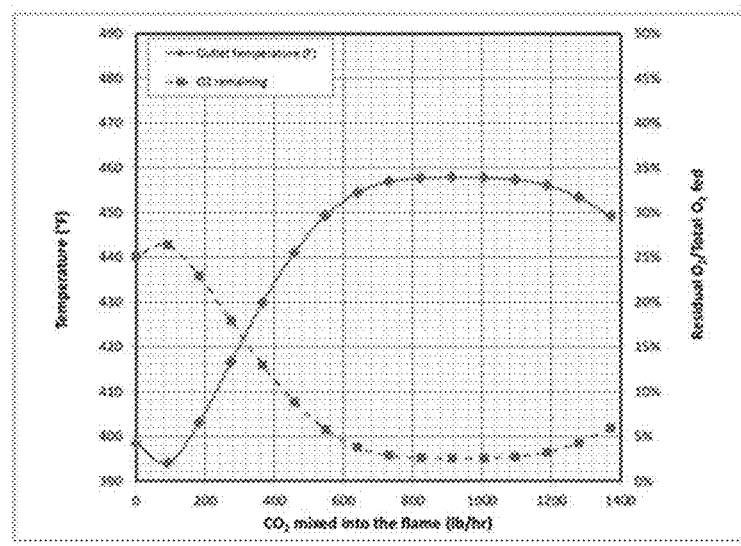
FIG. 5 is a plot of temperature and residual oxygen in heated stream as a function of diluent amount.

FIG. 5 is a simplified schematic of yet another exemplary embodiment. This process configuration employs plurality of stages. As shown, a small, controlled, amount of the fluid to be heated is entrained into the burning fuel-oxygen mixture. The resulting first heated fluid will contain less products of incomplete combustion. At the exit of the shroud the remaining fluid to be heated mixes quickly with the first heated fluid, resulting in the desired heated fluid. Since the CO and $H_2$ are avoided in the first stage, that is, the equilibrium temperature and concentration of the first heated mixture favors $CO_2$ and $H_2O$, the overall combustion efficiency is improved. Since the mixing, and therefore quench time between the first heated fluid and the fluid to be heated can impact the net heat release, it may be advantageous to mix in multiple stages as shown in FIG. 4. First, a small amount of diluent is mixed entrained into the shroud to mix with the burning fuel and oxidant to form the first heated mixture. A controlled amount of the fluid to be heated is introduced into a first stage. Mixing of this portion of the fluid to be heated with the first heated mixture results in an intermediate heated fluid with a high enough temperature to enable the combustion reactions to be complete and reach an equilibrium concentration, or near equilibrium, that contains little or no CO or $H_2$. The remaining fluid to be heated is mixed with the intermediate heated fluid to generate the final desired heated fluid. The method shown in FIG. 4 is particularly useful when the introduction of the diluent could cause problems with flame stability or pollutant formation.

In accordance with the present invention a diluent that is not a fuel can be utilized to modify the flame reaction mixture. Although excess oxidant could be used as the diluent, the resulting increased $O_2$ in the product could be detrimental to many applications. The diluent can be introduced separately or mixed with oxidant or mixed with fuel or mixed with both oxidant and fuel. The amount of diluent added to the flame is controlled to modify the residence time and temperature of reactive species in a manner that promotes complete combustion. The resulting flame is allowed to interact with at least a portion of the fluid to be heated, forming a high temperature gas. The high temperature gas then mixes with the remaining portion of fluid to form the heated fluid.

In an exemplary embodiment the diluent and the fluid to be heated are different fluids. This could be advantageous in avoiding pollution formation. For example, the diluent can be a non-nitrogen containing fluid to avoid formation of NOx in the first zone if the fluid to be heated contains nitrogen. Yet in another embodiment the diluent may be derived from the fluid to be heated. And most importantly the introduction of fluid to be heated into the combustion products must be sufficiently slow to accommodate complete reaction between CO, $H_2$, and $O_2$ prior to thermal quenching this reaction.

The present invention identifies a promising solution that delays mixing of fluid to be heated with a flame until the combustion reaction is complete; combusting a fuel with molecular oxygen containing gas in the presence of a diluent to form a flame, a heated gas mixture containing higher amounts of heat released than possible when combusting in the absence of a diluent. Additional benefits include less severe process conditions since the flame/heated gas mixture temperature can be considerably lower when the diluent is used compared to that when the diluent is absent. The invention is further explained through the following examples based on various embodiments of the invention, which are not to be construed as limiting the present invention.

EXAMPLE

The process configuration depicted in FIG. 3 was modeled to heat a $CO_2$ stream. The $CO_2$ stream mixes rapidly in a controlled manner with the products of flame formed by combustion of a fuel gas such as methane with an oxidant containing molecular oxygen. For this particular example the burner was assumed to be a simple coannular type (i.e. no swirl) designed to combust 1000 scfh methane and 2000 scfh of oxygen, generating a turbulent diffusion flame. Heat released by the combustion heated a stream of 10,000 lb/hr $CO_2$ at 200 psig by direct contact. The mixing of $CO_2$ can be controlled, in part through the selection of the burner geometry, including the configuration of any recess. Since no devices or methods, such as bluff bodies or swirl were assumed to increase flame zone mixing, the mixing in the flame zone was estimated using standard entrainment correlations for reacting turbulent diffusion flames known in the art. This estimate of mixing rate was coupled with a kinetic model where the flame and the post flame region were described by a series of perfectly stirred reactors (PSR). The amount of gas entrained into the flame at each location was added to the PSR for that location. Using this modeling technique, direct contact heating scenarios with varying amounts of $CO_2$ mixing with the $O_2$/methane combustion reaction mixture followed by remainder of the $CO_2$ mixing with the flame products to form the heated $CO_2$ stream were modeled. The 10,000 lb/h $CO_2$ stream was divided into two portions. The first portion was added to the perfectly stirred reactors (PSR) describing the flame region. This first portion served as a diluent in whose presence the combustion reactions proceeded. The product of the flame region, heated gas mixture provided the thermal energy for heating the second portion (remainder of the $CO_2$). Both the heated gas mixture (flame) and the second portion of $CO_2$ served as feed to the PSR describing the post flame region that produced the heated $CO_2$ stream. The oxygen conversion was estimated assuming residence time to be 200 milliseconds. The modeling results are plotted in FIG. 5 with the amount of diluent added to the combustion reaction mixture as x-axis, final temperature of heated $CO_2$ stream as left-side y-axis and the ratio of residual oxygen in the heated $CO_2$ stream to that fed to the burner as right-side y-axis. To establish a base line, the common prior art practice that restricts mixing between the $CO_2$ and the $O_2$/methane in the flame zone was also modeled. This could be accomplished through such means as separating the flame completely from the $CO_2$. As can be seen from FIG. 5 this condition (0 lb/hr $CO_2$ into flame) results in low final $CO_2$ temperature and high residual $O_2$, both indicators of incomplete combustion. FIG. 5 also shows that when the diluent, $CO_2$ is present with the $O_2$/methane reaction mixture in the flame zone, then there exists an optimal diluent amount that maximizes performance for the particular process configuration modeled.

Figure 6:
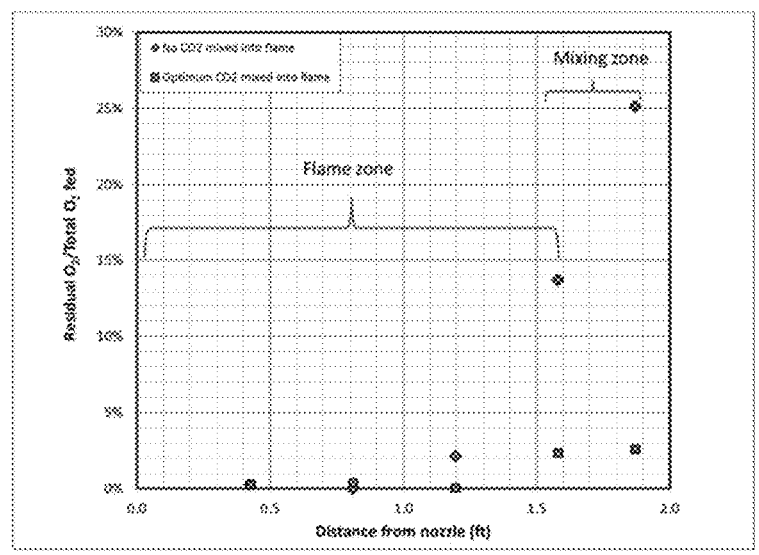
FIG. 6 is a plot of kinetic modeling results.

The output of the kinetic modeling, shown in FIG. 6, highlights the advantages of the subject invention. As shown in FIG. 6, the amount of oxygen contained in the flame increases along the length of the flame in the absence of diluent addition (i.e. no $CO_2$ is added to the combustion reaction mixture). This is the result of the flame at or near chemical equilibrium containing high concentrations of dissociated products. This is illustrated in Table 1 for the conditions outlined in this example.

Table 1. Comparison of Equilibrium and Kinetic Results for Example System

TABLE 1

Comparison of equilibrium and kinetic results for example system

|  | Optimal CO2 in flame | | No CO2 in flame | |
| --- | --- | --- | --- | --- |
|  | Equilibrium | Kinetic | Equilibrium | Kinetic |
| T (F.) | 2682 | 2654 | 5674 | 5674 |
| Gas (vol %) | | | | |
| H2 | 0.01% | 0.02% | 6.16% | 6.12% |
| H | 0.00% | 0.00% | 3.09% | 3.08% |
| O | 0.00% | 0.00% | 2.79% | 2.80% |
| O2 | 0.05% | 0.24% | 7.55% | 7.64% |
| OH | 0.01% | 0.02% | 9.45% | 9.47% |
| H2O | 18.35% | 18.26% | 43.14% | 43.12% |
| HO2 | 0.00% | 0.00% | 0.02% | 0.02% |
| CO | 0.11% | 0.36% | 14.93% | 14.87% |
| CO2 | 81.47% | 81.09% | 12.86% | 12.89% |

As can be seen from the table the no-$CO_2$ added flame contains a significant amount of oxygen and oxygen containing radicals at equilibrium. When the remaining $CO_2$ is mixed quickly with this stream this residual oxygen increases due to recombination of the oxygen containing radicals and quenching of the $CO/H_2$ oxidation reactions. However, under the optimal conditions for this example the amount of $O_2$ and oxygen containing radicals in the flame is very low. Therefore the quenching of this flame by addition of the remaining $CO_2$ still results in low residual oxygen.

Figure 7:
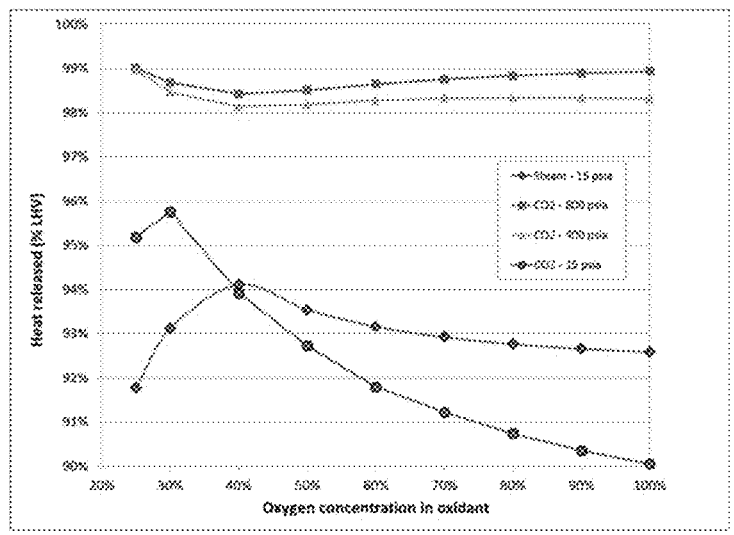
FIG. 7 is a plot of net heat released as a function of diluent amount.
Figure 8:
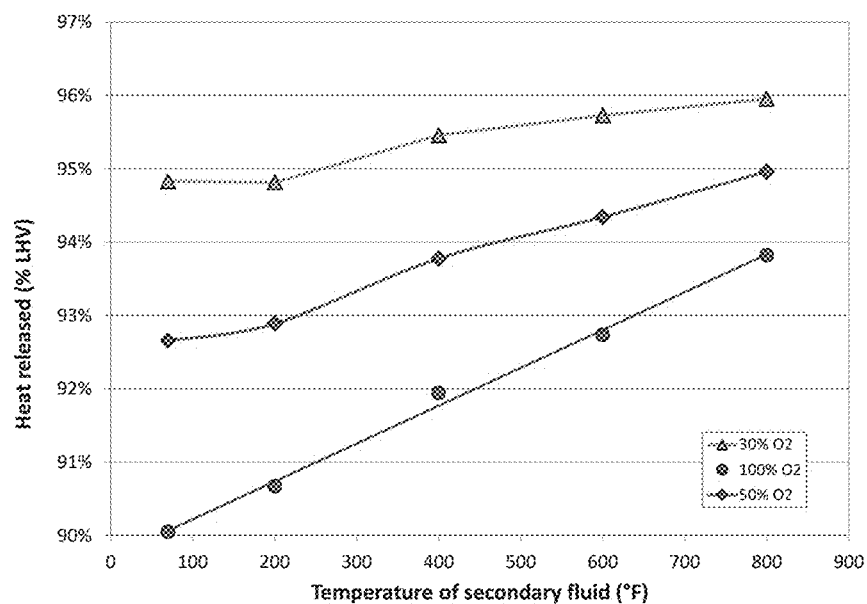
FIG. 8 is a plot of net heat released as a function of fluid initial temperature.

Different operating conditions may lead to different optimal mixing rates of the diluent into the flame. This is illustrated in FIGS. 7 and 8 that plot results for heating steam or $CO_2$ at different pressures and initial temperatures. Some conditions require lower oxygen concentrations while others need higher oxygen concentrations. Rapid quenching of the flame prevents the dissociated species, particularly CO and $H_2$ present in the flame from reacting with the remaining $O_2$. Therefore, the net heat released and available for heating the fluid is reduced. The presence of diluent can shift the chemical equilibrium towards more complete combustion products, leading to a higher net heat release. However, at some point the kinetics are slowed down enough due to the presence of the diluent, that the reactions are not complete before the fluid to be heated is introduced. Therefore, the present invention serves to mix enough diluent into the flame zone to maximize the net heat release while still completing the reactions. This method both increases the efficiency of the heating process, as well as reduces the amount of residual species such as CO, $H_2$, and $O_2$ in the heated fluid.

As described above there are several ways to provide the required amount of diluent in whose presence the combustion reactions proceed. For example, burner/combustor design features such as recess geometry, nozzle sizes can be selected to entrain the desired amount of $CO_2$ into the flame zone. Note, when the $CO_2$ mixing rate into the flame is higher than the optimum, the resulting flame dilution leads to degradation of the combustion reactions in the flame zone itself. For burner designs employing devices or methods, such as bluff bodies or swirl or defined recess geometry to increase flame zone mixing, computational fluid dynamics (CFD) technique can be used to predict the impact of mixing some of the $CO_2$ directly into the flame zone.

Although various embodiments have been shown and described, the present disclosure is not so limited and will be understood to include all such modifications and variations as would be apparent to one skilled in the art.

What is claimed is:

1. A combustion method, comprising:
   a) providing a fuel, an oxidant, a diluent that is not a fuel, and a fluid to be heated;
   b) reacting the fuel with the oxidant forming a flame envelope in the presence of the diluent to form a first heated fluid within a combustor to protect the flame envelope through a physical staging where the combustor has two pipes of different sizes where an inner pipe of the two pipes forms a shroud to the flame envelope and an outer pipe of the two pipes is employed to provide the diluent to said first heated fluid forming a final heated fluid downstream of a zone of said combustor, wherein the diluent is provided in a controlled manner by calculating a desired diluent mixing rate for the amount of fuel and oxidant provided via computational fluid dynamics and adjusting fuel and oxidant nozzle sizes of the combustor or recess geometry of the combustor accordingly to achieve the desired diluent mixing rate and supplying the diluent at the desired mixing rate to thereby form said first heated fluid while limiting quench of said combustion and minimizing the formation of disassociated species by shifting chemical equilibrium of the fuel and oxidant reaction and reducing the temperature within combustion zone to thereby increase combustion efficiency;
   c) forming the final heated fluid by directly contacting the fluid to be heated with the first heated fluid;
   wherein the final heated fluid contains lower concentrations of carbon monoxide, hydrogen, and/or molecular oxygen than obtainable by directly contacting the fluid to be heated with the first heated fluid without dilution.

2. A direct contact heating method, comprising:
   a) providing a fuel, an oxidant, a diluent that does not contain fuel;
   b) reacting the fuel with the oxidant in the presence of the diluent to form a first heated fluid within a combustor, wherein the diluent is provided in a controlled manner by calculating a desired diluent mixing rate for the amount of fuel and oxidant provided via computational fluid dynamics and adjusting fuel and oxidant nozzle sizes of the combustor or recess geometry of the combustor accordingly to achieve the desired diluent mixing rate and supplying the diluent at the desired mixing rate to thereby form said first heated fluid while limiting quench of the first heated fluid and shifting chemical equilibrium of the fuel and oxidant reaction within a combustion zone to thereby increase combustion efficiency;
   c) forming a heated fluid by directly contacting a fluid to be heated in a controlled manner through physical staging where the combustor has two pipes of different sizes where an inner pipe of the two pipes forms a shroud to the flame envelope and an outer pipe of the two pipes is employed to provide the diluent to the first heated fluid;
   wherein the heated fluid contains lower concentrations of carbon monoxide, hydrogen, and/or molecular oxygen than obtainable by directly contacting the fluid to be heated with the first heated fluid without dilution.

3. The method of claim 1, wherein the diluent and the fluid to be heated are the same type of fluid.

4. The method of claim 2, wherein the diluent and the fluid to be heated are the same type of fluid.

5. The method of claim 1, wherein the diluent is different from the fluid to be heated with respect to one or more of temperature, pressure, and composition.

6. The method of claim 4, wherein the diluent is different from the fluid to be heated with respect to one or more of temperature, pressure, and composition.

* * * * *